United States Patent Office 2,808,408
Patented Oct. 1, 1957

2,808,408

(BICYCLO-OCTENYL)-ALKYL MALONIC ACID DERIVATIVES

William Taub, Rehovoth, Israel, assignor, by mesne assignments, to Calanda Stiftung, Zurich, Switzerland, a Swiss company No Drawing. Application March 29, 1956, Serial No. 574,643

Claims priority, application Great Britain August 26, 1955

4 Claims. (Cl. 260—257)

This invention relates to new derivatives of (bicyclo-octenyl)-alkyl malonic acid, namely (bicyclo-octenyl)-alkyl cyanoacetic acid derivatives and 5-(bicyclo-octenyl)-5-alkyl barbituric acids made therefrom. The said barbituric acids correspond to the general formula:

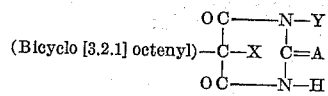

in which X stands for a saturated or unsaturated alkyl group, Y stands for a saturated or unsaturated alkyl group or hydrogen, and A is an oxygen or sulphur atom.

The said (bicyclo-octenyl)-alkyl malonic acid derivatives which can also be considered as cyanoacetic acid derivatives correspond to the general formula:

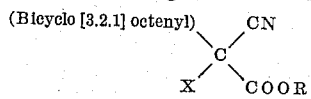

wherein X has the meaning defined above and R stands for a lower alkyl group. The bicyclo-octenyl cyanoacetic acid alkyl esters are prepared by condensing bicyclo [3.2.1] octane-2-one with cyanoacetic acid alkyl esters, e. g. in the presence of ammonium acetate and acetic acid. The saturated or unsaturated alkyl groups referred to as X in the above formula are introduced at the same carbon atom to which the bicyclo-octenyl radical is connected by reaction with, e. g. alkyl halides.

The preparation of the new derivatives of barbituric acid is analogous to that of known substances of this series and comprises the condensation between an ester, amide, nitrile, chloride or other acid derivative of bicyclo-octenyl cyanoacetic or malonic acid on the one hand, and urea or a derivative or related compound such as guanidine, thiourea, dicyanodiamide or isourea ethers, or the saturated or unsaturated alkyl derivatives of such compounds on the other hand. The alkyl groups, saturated or unsaturated, of the $C_5$-atom referred to as X in the first formula, may be introduced into the cyanoacetic or malonic acid prior to such condensation, or into the barbiturates resulting from the condensation.

The free bicyclo-octenyl barbituric acids may be converted into their salts with inorganic or organic bases.

The free barbituric acids and their salts exert a hypnotic action and can be used as soporifics by peroral administration, e. g. in the form of tablets. They can also be used as anaesthetics when injected intravenously in the form of a solution of said salts.

The following examples to which the invention is not limited, illustrate how bicyclo-octenyl barbituric acids may be prepared. The temperatures are in degrees centigrade.

Example 1

Bicyclo-octenyl cyanoacetic acid ethyl ester is prepared by condensing bicyclo-3.2.1-octane-2-one with cyanoacetic acid ethyl ester in the presence of ammonium acetate and acetic acid.

For this purpose, a mixture of 124 g. of bicyclo-3.2.1-octane-2-one (cf. Ber. 71, p. 2407, Alder, Windemuth), 125 g. of cyanoacetic acid ethyl ester, 40 g. of ammonium acetate, 50 ml. of glacial acetic acid and 350 ml. of dry benzene is refluxed in a 2 litre flask provided with a condenser and a water separator for several hours until no more water separates from the reaction mixture. The reaction mixture is now washed with water in order to remove the remaining ammonium acetate, the solvent is distilled off at reduced pressure and the rest is subjected to fractionation in vacuo. The fraction distilling at 145–150° under a pressure of 2 mm. is collected separately and forms the desired bicyclo-octenyl cyanoacetic acid ethyl ester. The bicyclo-octenyl cyanoacetic acid ethyl ester is a colourless liquid.

Into this compound, a saturated or unsaturated alkyl radical such as methyl, ethyl or allyl is introduced at the same C-atom to which the bicyclo-octenyl radical is connected. This is done for example, in the following way:

21.9 g. of the said ester are added to a solution of 2.3 g. of sodium metal in 50 ml. of absolute ethanol. To this mixture 14.3 g. of methyl iodide are gradually added while cooling, and the whole is heated under reflux until the reaction has become neutral. After distilling off the ethanol, the mixture is taken up in water and the oily layer taken up in ether. After removing the solvent at reduced pressure, the (bicyclo-octenyl)-methyl cyanoacetic acid ethyl ester distils at 125–135° under a pressure of 2.5 mm.

23.3 g. of this latter substance are dissolved in a solution of 4.6 g. of sodium in 100 ml. of abs. methanol, 9.2 g. of urea are added thereto, and the mixture is refluxed for about 4 hours. The methanol is then distilled off in vacuo, the residue is dissolved in cold water. To this solution, 100 ml. of 25% sulphuric acid are added and the mixture refluxed for 2 hours. After cooling, the organic layer is taken up in ether, the ethereal solution is extracted with a slight excess of 5% NaOH solution. 5-(bicyclo-octenyl)-5-methyl barbituric acid is precipitated from this aqueous alkaline solution by means of diluted hydrochloric acid. The precipitate is recrystallised from isopropanol and forms colourless needles of faintly bitter taste showing a melting point of 266°.

A salt of this compound with an organic base may be prepared in the following way:

25.0 g. of the aforesaid barbituric acid are dissolved in 400 ml. of pure methanol and to this solution 11.7 g. of diethylamino ethanol, dissolved in 60 ml. of methanol, are added in the cold. The mixture is evaporated to dryness in vacuo at 40°. The salt so formed is advantageously used, for therapeutic purposes, in aqueous solution which is to be protected against the access of carbon dioxide.

Example 2

Instead of (bicyclo-octenyl)-methyl cyanoacetic acid ethyl ester, (bicyclo-octenyl)-ethyl cyanoacetic acid methyl ester is prepared in an analogous manner, by the condensation of bicyclo-3.2.1-octane-2-one with cyanoacetic acid methyl ester and subsequent introduction of an ethyl group, such as by means of ethyl bromide. An equivalent amount of this compound is condensed with urea in the manner described in Example 1. The 5-(bicyclo-octenyl)-5-ethyl barbituric acid so obtained forms colourless needles melting at 213° after recrystallisation from isopropanol.

Example 3

25.9 g. of (bicyclo-octenyl)-allyl cyanoacetic acid ethyl ester, prepared similarly to the corresponding ethyl compound, are dissolved in a solution of 4.6 g. of sodium in 100 ml. of absolute methanol to which 9 g. of dicyanodiamide are added. The mixture is refluxed for 5 hours. The methanol is then evaporated at reduced pressure and the (bicyclo-octenyl)-allyl cyanimino barbituric acid which can be isolated as an intermediate product, is saponified by boiling with eight times its amount of 25% sulphuric acid for six hours. The 5-(bicyclo-octenyl)-5-allyl barbituric acid thereby formed is allowed to cool down, filtered off and recrystallised from diluted isopropanol. It forms colourless needles and melts at 206°.

Example 4

23.3 g. of (bicyclo-octenyl)-methyl cyanoacetic acid ethyl ester are dissolved in a solution of 4.6 g. of sodium in 100 ml. of absolute methanol to which 9 g. of dicyanodiamide are added and the mixture is heated to about 70° for 6 hours. When the mass has cooled down, 24 g. of dimethyl sulphate are added dropwise, care being taken that the temperature does not rise above 50°. Hereafter the methanol is evaporated at reduced pressure and the residue is boiled with eight times its amount of 25% of sulphuric acid. The 5-(bicyclooctenyl)-5-methyl-1-methyl barbituric acid thereby formed is allowed to cool down, filtered off and recrystallised from diluted methanol. It forms colourless crystals of M. P. 174°.

Example 5

24.7 g. of (bicyclo-octenyl)-ethyl cyanoacetic acid ethyl ester are dissolved in a solution of 4.6 g. of sodium in 120 ml. of absolute ethanol to which 8 g. of thiourea are added. The mixture is refluxed for about 5 hours. The alcohol is then evaporated, the residue dissolved in about 150 ml. of water and saponified by refluxing with eight times its amount of 25% sulphuric acid. After purification by dissolving in an excess of aqueous alkali and by reprecipitating by means of acetic acid, the crude 5-(bicyclooctenyl)-5-ethyl thiobarbituric acid is recrystallised from diluted methanol. It forms colourless crystals of M. P. 198°.

Example 6

21.9 g. of (bicyclo-octenyl)-methyl cyanoacetic acid methyl ester are dissolved in a solution of 4.6 g. of sodium in 100 ml. of absolute methanol. To this solution 8 g. of thiourea are added and the mixture is refluxed for about 4 hours. The methanol is evaporated and the residue dissolved in water and saponified by refluxing with an excess of 10% hydrochloric acid. The crude 5-(bicyclo-octenyl)-5-methyl thiobarbituric acid is recrystallised from isopropanol and melts at 227°.

Example 7

24.7 g. of (bicyclo-octenyl)-ethyl cyanoacetic acid ethyl ester are dissolved in a solution of 4.6 g. of sodium in 100 ml. of absolute ethyl alcohol to which 16.0 g. of N-methyl acetyl urea are added. The mixture is refluxed for about 5 hours. The alcohol is then evaporated at reduced pressure and the residue is saponified by refluxing with 10% hydrochloric acid in excess for 2 hours. The crude product is recrystallised from isopropanol. The pure 5-(bicyclo-octenyl)-5-ethyl-1-methyl barbituric acid forms colourless crystals and melts at 173°.

Example 8

24.5 g. of (bicyclo-octenyl)-allyl cyanoacetic acid methyl ester are dissolved in a solution of 4.6 g. of sodium in 100 ml. of absolute methanol. To this solution 8 g. of thiourea are added and the mixture is gently refluxed for about 4 hours. The methanol is evaporated and the residue dissolved in water and saponified by refluxing with an excess of 10% hydrochloric acid. After recrystallisation from alcohol, the 5-(bicyclo-octenyl)-5-allyl thiobarbituric acid melts at 195°.

What I claim is:

1. (Bicyclo-octenyl)-alkyl malonic acid derivatives corresponding to the formula:

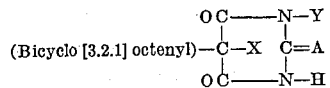

wherein A represents a member selected from the group consisting of oxygen and sulphur, X represents a member selected from the group consisting of lower alkyl and allyl, and Y represents a member selected from the group consisting of hydrogen and methyl.

2. 5-(bicyclo [3.2.1] octenyl)-5-ethyl barbituric acid, having a melting point of 213° C.

3. 5-(bicyclo [3.2.1] octenyl)-5-ethyl thiobarbituric acid, having a melting point of 198° C.

4. 5-(bicyclo [3.2.1] octenyl)-5-ethyl-1-methyl barbituric acid, having a melting point of 174° C.

References Cited in the file of this patent

UNITED STATES PATENTS 2,744,900    Reppe et al.   _____ May 8, 1956

FOREIGN PATENTS 925,168    Germany   _____ Mar. 14, 1955